United States Patent [19]
Dandliker et al.

[11] 3,776,636
[45] Dec. 4, 1973

[54] PROCESS AND APPARATUS FOR INVESTIGATING THE COHERENCE OF LIGHT RADIATION

[75] Inventors: Rene Dandliker, Oberrohrdorf; Francois Mottier, Zurich, both of Switzerland

[73] Assignee: Aktiengesellschaft Brown, Boveri & Cie, Baden, Switzerland

[22] Filed: Feb. 22, 1972

[21] Appl. No.: 227,937

[30] Foreign Application Priority Data
Feb. 23, 1971  Switzerland.......................... 2637/71

[52] U.S. Cl............................... 356/106, 356/113
[51] Int. Cl. ........................................... G01b 9/02
[58] Field of Search ............................ 356/106–113

[56] References Cited
UNITED STATES PATENTS
3,641,343   2/1972   Langer................................ 356/113

Primary Examiner—David Schonberg
Assistant Examiner—Conrad Clark
Attorney—Norman F. Oblon et al.

[57] ABSTRACT

A process and an apparatus are disclosed for examining the mode structure or coherence of laser light beams. According to the process, the laser beam to be studied is first divided into two portions which are projected onto a diffusely scattering body in a superimposed fashion. If the laser beam is not coherent, patterns are formed on the scattering body which are visually observable. No visible interference fringes are formed if the laser beam is strictly coherent. The apparatus disclosed includes a beam splitter for dividing the laser beam into two portions, and an optical system for projecting the two beam portions onto a diffusely scattering body. The diffusely scattering body may be comprised of a variety of materials, such as white paper, and may include a calibrating scale.

10 Claims, 4 Drawing Figures

3,776,636

PROCESS AND APPARATUS FOR INVESTIGATING THE COHERENCE OF LIGHT RADIATION

BACKGROUND OF THE INVENTION

1. Field of the Invention

This invention relates generally to a method and apparatus for studying laser beams, and more particularly to a method and apparatus for investigating the coherence of laser radiation.

2. Description of the Prior Art

In the past, the Fabry-Perot Interferometer has been used for studying the coherence of laser beams. This device usually consists of two mirrors of the highest quality mounted a variable distance apart. The light passing through the device is converted into an electrical signal, and is observed on an oscilloscope. This system measures the various parameters of importance in determining the coherence of laser beams; namely, the coherence time $\tau$, the frequency bandwidth $$\Delta \nu = (1/\tau)$$

and the coherence length $$l_c = C \cdot \tau$$

(where $C$ = the velocity of light) of the radiation being studied. The problem with the Fabry-Perot Interferometer is that it requires several delicate, precision optical components, as well as sophisticated electronic equipment, and is accordingly delicate and very expensive.

However, it is very important to investigate the coherence of laser beams, since many applications of laser beams depend upon the presence of only a single frequency of light radiation. For example, in interferometry, holography, and other similar fields, it is very important that a laser must emit light in only a single longitudinal mode.

Thus, a need exists for a simple, reliable and inexpensive technique and apparatus for studying the coherence of laser beams.

SUMMARY OF THE INVENTION

Accordingly, one object of this invention is to provide a novel method for studying the coherence of laser radiation.

Yet another object of this invention is to provide a novel method for studing the coherence of laser radiation which is both simple and reliable.

A still further object of this invention is to provide a novel method for investigating the coherence of laser beams which is simple and inexpensive to implement.

Another object of this invention is to provide a novel apparatus for studying the coherence of laser radiation.

Yet another object of this invention is the provision of a novel yet simple and inexpensive apparatus for investigating the coherence of laser beams.

Briefly, these and other objects of the invention are achieved according to the method of the present invention by splitting the laser beam to be studied into two portions, and angularly projecting both portions of the beam onto a diffusely scattering body so that the projected beam portions are superimposed on one another. The resulting patterns, if any, are then observed and analyzed to determine the coherence of the laser beam.

The above and other objects are achieved according to the apparatus of the present invention by providing a beam splitter for dividing a laser beam into two portions. An optical system is also provided for projecting both beam portions onto a diffusely scattering body. The beams may be observed visually, or by means of photographic apparatus.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

According to the present invention, the beams of light radiation to be investigated [lying in the range from zero to at least $C/2\Delta\nu$, where $C$ is the velocity of light, and $\Delta\nu$ is the frequency range in which the study is to be carried out] are superimposed on a diffusely scattering body or surface. Path differences $\Delta l$ [lying in the range from zero to at least $C/2\Delta\nu$, wherein $C$ is the velocity of light, and $\Delta\nu$ is the frequency range in which the study is to be carried out] are produced between the rays of the two beams impinging at the same point on the diffusely scattering surface.

It is particularly advantageous to locally vary the path differences $\Delta l$ in the region of investigation on the scattering surface. This may, for example, be achieved by using mirrors and lenses to project two portions of the radiation beam to be investigated onto the diffusely scattering surface in a mutually inclined fashion.

If this is done, an interference fringe pattern which is incapable of visual resolution and having fringe widths of at most a few light-wavelengths, is produced, [provided the radiation is strictly coherent.] The pattern thus produced appears to the observer to be consistently granulated or speckled [cf. Journal Opt.Soc. Am. 55 (1965), p.247 et seq.; Swiss Patent (patent application 737/70)] [provided the radiation is strictly coherent]. However, if the radiation is not strictly coherent, stripes in which the intensity or contrast of the speckles is greatly reduced appear in the speckled pattern. The width $b$ of a high intensity stripe is related to the coherence length $l_c$ of the radiation to be investigated by the formula:

$$b = l_c / (\sin\alpha_1 + \sin\alpha_2),$$

wherein $\alpha_{1,2}$ are the incident angles of the first and second beam portions, respectively, relative to the diffusely scattering surface.

As will now be understood by those skilled in the art, not only can it be quickly and simply determined by the instant invention whether the radiation of a laser is strictly coherent, but in addition, its coherence length and coherence function can be defined.

Figure 1:
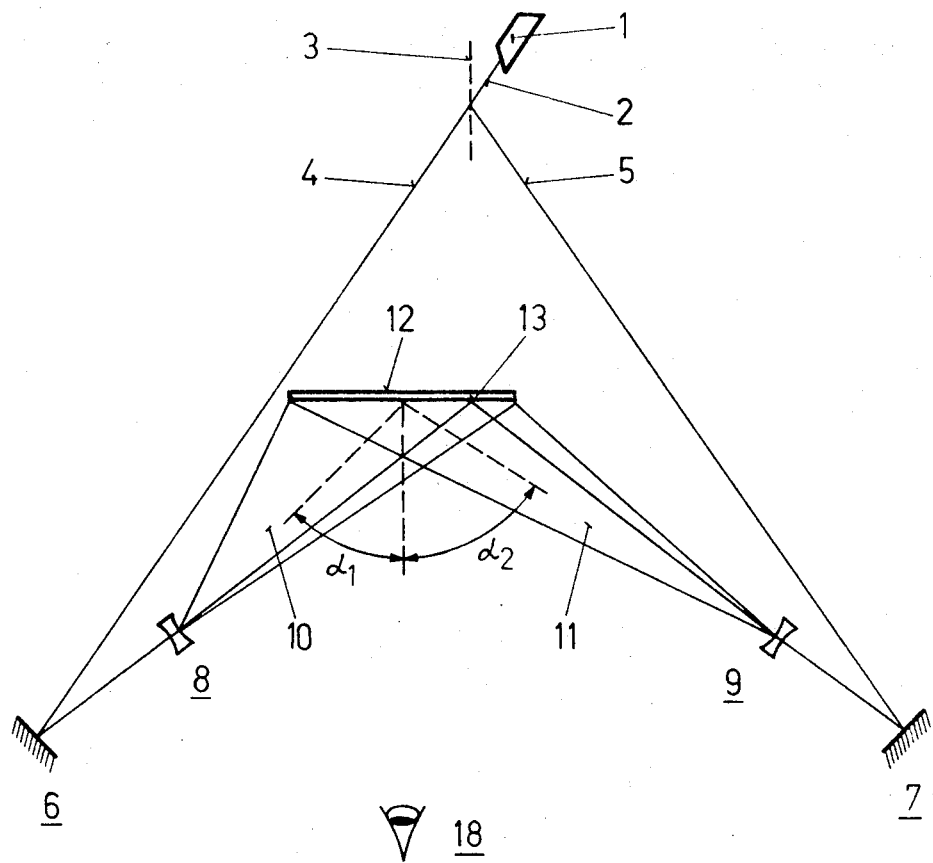
FIG. 1 is a schematic diagram of one embodiment of the optical system of the present invention illustrating an arrangement in which two mutually inclined beams of the light radiation to be investigated are superimposed on a diffusely reflecting body.

Referring now to the drawings, wherein like reference numerals designate identical or corresponding parts throughout the several views, and more particularly to FIG. 1 thereof, a laser 1 is illustrated, emitting a light beam 2 the coherence of which is to be investigated. The light-beam 2 is divided by means of a beam-splitter 3 into two beam portions 4, 5, preferably of equal intensity. The beam portions 4, 5 are deflected via mirrors 6, 7 and expanded by means of lenses 8, 9 to form divergent beams 10, 11 for illuminating a diffusely reflecting surface or body 12. The diffusely reflecting body 12 may, for example, consist of a white painted, or a sand-blasted or similarly treated metal disk. The diffusely reflecting body 12 may even quite simply take the form of rigid white paper. The diffusely reflecting body may also be replaced by a diffusely scattering transparent body, for example a matt glass disk. The matt glass disk may be observed by reflection or transmission. In the latter case, the observer 18 in FIG. 1 would have to be positioned between the laser 1 and the body 12.

The divergent beams 10, 11 impinge on the body 12 at the mean incident angles $\alpha_1$ and $\alpha_2$. The body 12 may be observed visually by the observer 18, or by means of a photooptical system. [

The rays of the mutually inclined divergent beams 10, 11 impinging on the same point of the body 12 exhibit path differences $\Delta l$ which vary depending on the location of the body 12. This results (in a known manner) in an interference stripe or fringe pattern with the fringe width being $\delta \approx c/]]\nu \cdot (\sin\alpha_1 + \sin\alpha_2)]$, where $\nu$ is the frequency of the laser radiation.

Figure 2:
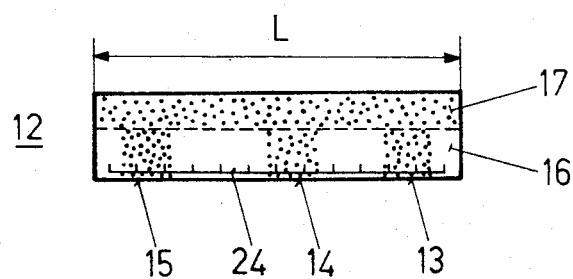
FIG. 2 is an illustration of the speckle pattern which appears on the diffusely reflecting body if the laser beam is not strictly coherent.

FIG. 2 illustrates the surface of the body 12 as it appears to the observer 18. As long as the laser radiation is strictly coherent, that is to say $$\Delta\nu = 0,$$

the body 12 appears to the observer 18 to be consistently granulated or speckled, as in the region 17. However, if $$\Delta\nu \neq 0,$$

the laser 1 is thus, for example, emitting two frequencies $\nu_1$ and $\nu_2$, so that $$\Delta\nu = |\nu_1 - \nu_2|$$

strips of high speckle contrast result as shown at 12, 14, 15 with strips of reduced speckle contrast between them, as indicated in a region 16.

Maximum contrast prevails where the path difference $\Delta l$ between rays impinging on the same point is:

$$\Delta l = n \cdot c/\Delta\nu,$$

where $n$ is an integer. In FIG. 1 and FIG. 2, maximum contrast for $\Delta\nu = 0$ is designated by 13. The maxima 14, 15 in FIG. 2 follows for $$\Delta l = c/\Delta\nu$$

and $$\Delta l = 2c/\Delta\nu$$

The contrast minima between them follows for $$\Delta l = (2n + 1/2) \cdot c/\Delta\nu.$$

An explanation for the change in contrast dependent on coherence may be seen in that the fringe widths $\delta$ of the interference pattern depend on the frequency $\nu$ of the light-radiation producing them. The inclined beams of rays 10, 11 becoming superimposed on the diffusely reflecting body 12 result in an interference pattern having a fringe width $\delta_1$ for the frequency $\nu_1$, and an interference pattern having a fringe width $\delta_2$ for the frequency $\nu_2$.

The maxima of these two patterns coincide for points $$\Delta l = n \cdot c/\Delta\nu,$$

with the result that the speckled pattern exhibits maximum contrast. However, the patterns are displaced by half a fringe width with respect to one another at points with $$\Delta l = (2n+1/2) \cdot c/\Delta\nu,$$

so that different speckle patterns are produced for each wavelength, which becomes noticeable as a reduction in contrast when the patterns are superimposed. Similarly, when there are more than two frequencies per laser radiation line, a plurality of different speckle patterns are superimposed. The contrast is then high for path differences of $$\Delta l < l_c,$$

and low for regions with $$\Delta l > l_c.$$

The arrangement illustrated in FIG. 1 may, for example, serve to investigate an argon ion laser wherein the frequency bandwidth $\Delta\nu$ is of the order of magnitude of $$\Delta\nu \approx 3 \cdot 10^9 \text{ Hz}.$$

The path difference at which the first contrast minimum occurs is then $$\Delta l \approx 5 \text{ cm}.$$

If the mutually inclined divergent beams of rays 10, 11 exhibit mean incident angles of $$\alpha_{1,2} = 30°,$$

the overall length L (FIG. 2) of the diffusely reflecting body 12 will then advantageously be more than about 20 cm. The divergence of the beam may be, for example, about 45°, and the distance between the lenses 8, 9 and the body 12, for example, about 20 cm. If the laser emits on two discrete lines, and thus the fringes are periodically distributed over the surface of the body 12, at least two contrast maxima (13, 14, 15) and at least two contrast minima can then be seen with the stated value for L.

In order that the speckle contrast may be more visible, the region 16, which is illuminated in the manner illustrated in FIG. 1 by two mutually inclined divergent light-beams 10, 11 is supplemented as shown in FIG. 2, by a region 17 on the surface of the body 12 which acquires its light only from a single source. In order to produce the region 17, the upper part of one of the beams 10 and 11 is expediently covered by a suitable mask, so that only one of the beams 10 or 11 illuminates the region 17. Since no changes in contrast of the kind described above can then occur in the region 17, the quality of coherence in the laser radiation can then be determined in simple fashion by seeing whether the contrast in the speckle pattern on the surface of the body 12 is everywhere the same as in the region 17, or whether contrast minima appear. In the former case the laser radiation is at a single frequency or strictly coherent, and in the latter case it is not.

It should further be mentioned that the contrast minima appear locally and periodically only when the laser is emitting on two or even more discrete lines. On the contrary, if the frequency-spectrum is continuous the contrast decreases continuously from a maximum at $$\Delta l = 0$$

to a minimum. Here also however, the width $b$ of the higher contrast stripe is linked to the coherence length $l_c$ by way of the above mentioned formula. For the purpose of direct measurement of the coherence length $$l_c = c/\Delta \nu$$

by measuring the width $b$ of a high contrast strip, the scattering body 12 is provided with a scale 24 which can be viewed by the observer 18 simultaneously with the illuminated surface of body 12.

Figure 3:
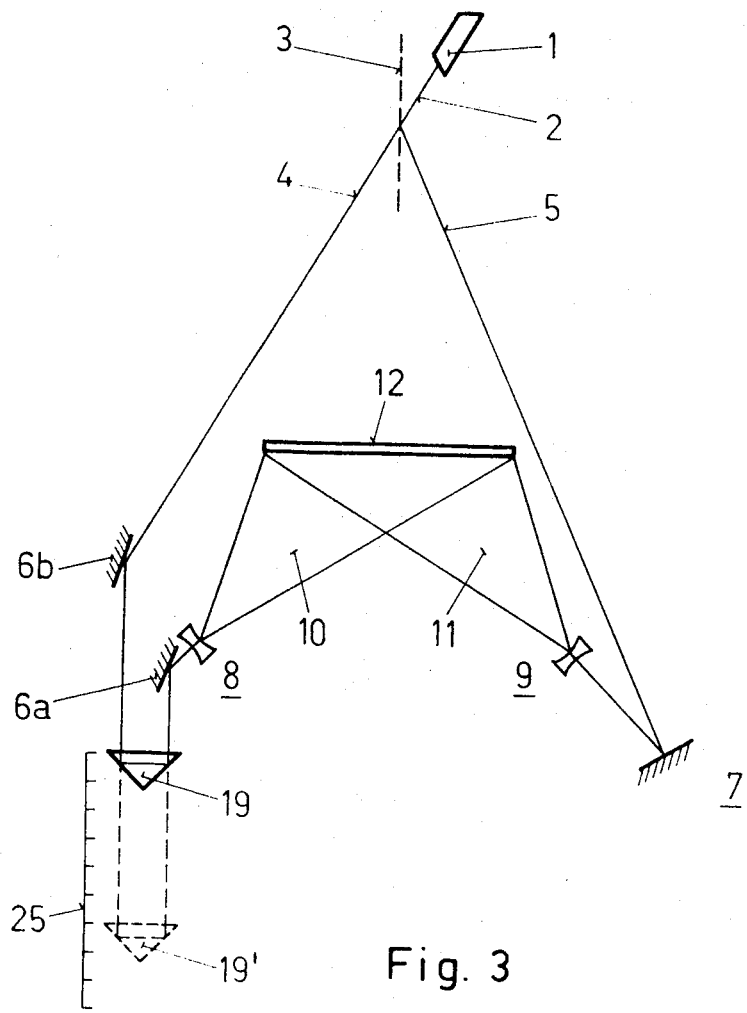
FIG. 3 is a schematic diagram of another embodiment of the optical system of the present invention which is similar to that of FIG. 1, except that a triple prism has been added to permit adjustment of the path difference between beam portions; and, FIG. 4 is a schematic diagram of a third embodiment of the invention in which the mirrors and lenses of the FIG. 1 embodiment have been replaced by additional diffusely reflecting bodies.

FIG. 3 illustrates an arrangement which can be advantageously used when the expected frequency differences are of the order of magnitude of $$\Delta \nu = 10^8 - 10^9 \text{ Hz}.$$

This is the case, for example, with the He-Ne laser. In order to produce a complete high contrast strip here on the body 12, its overall length L would have to be about 1m. In order to avoid this, a triple prism 19 is provided which can for example be moved into the position 19'. This alters the path length of the rays of the beam 4–10; the path differences $\Delta l$ of the rays impinging on the same point of the body 12 then change correspondingly, so that the strips of maximum or minimum contrast move across the body 12 when the triple prism 19 is moved. As may be seen, movement of the triple prism 19 in the manner illustrated by a distance s produces a path difference of $$\Delta l = 2\,s.$$

Multiple folding of the optical path, for instance by the arrangement of a plurality of reflectors, can produce several times the change $\Delta l$ in the optical path with the same mechanical change s in the path. Instead of the one mirror 6 illustrated in FIG. 1, two mirrors 6a and 6b are provided in the embodiment illustrated in FIG. 3. A scale 25 is provided here in order to measure the travel s of the triple prism 19 or of any other reflectors which there may be for the purpose of determining the path difference $\Delta l$, and thus the coherence length $l_c$.

Figure 4:
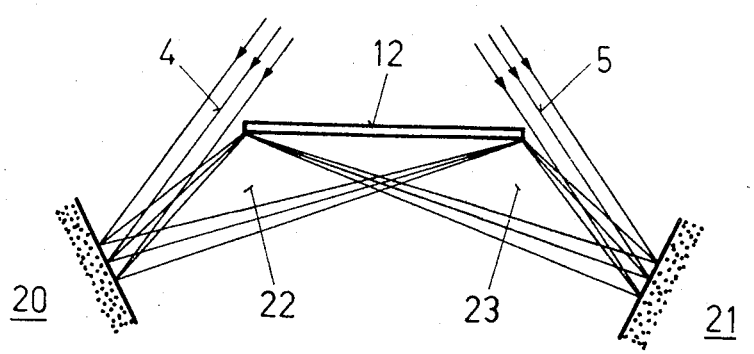

In FIG. 4, the beam portions 4, 5 which may be produced as in FIGS. 1 or 3, are scattered towards the body 12 on two additional diffusely scattering bodies 20, 21 which may be for example, matt white printed metal surfaces or white paper. In this arrangement, there is no need for optically clear elements 6, 6a, 6b, 7, 8 and 9. The body 12 is illuminated by beams of rays 22, 23. The effect to be observed is the same as in the embodiment illustrated in FIGS. 1 and 3.

It also follows from the last described embodiment that, for success in accordance with the invention within the scope of the accuracies striven for, it is not significant whether the diffusely scattering body 12 is illuminated with divergent or parallel beams of light rays.

Obviously, numerous additional modifications and variations of the present invention are possible in light of the above teachings. It is therefore to be understood that within the scope of the appended claims, the invention may be practiced otherwise than as specifically described herein. ACCORDINGLY,

What is claimed as new and desired to be secured by letters patent of the United States is:

1. An apparatus for studying the coherence of laser beams, comprising:
   means for producing a laser beam;
   optical means for splitting said laser beam into at least two portions;
   means for diffusely scattering incident light beams;
   means for projecting said two beam portions onto said diffusely scattering means in a mutually inclined fashion; and
   means for observing any patterns produced on said diffusely scattering means.

2. An apparatus for studying the coherence of laser beams as in claim 1, wherein:
   said means for projecting said two beam portions includes a plurality of optically clear elements.

3. An apparatus for studying the coherence of laser beams as in claim 1, wherein:
   said two beam portions are of equal intensity; and
   said means for projecting said two beam portions includes deflecting mirrors and lenses.

4. An apparatus for studying the coherence of laser beams as in claim 1, wherein:
   said means for projecting said two beam portions includes a plurality of diffusely scattering bodies.

5. An apparatus for studying the coherence of laser beams as in claim 3, wherein:
   said diffusely scattering means includes a planar surface having a length equal to at least $C/2\Delta\nu$; and,
   said beam portions are inclined with respect to one another and with respect to said planar surface so that said planar surface is entirely illuminated.

6. An apparatus for studing the coherence of laser beams as in claim 1, wherein:
   said means for projecting said two beam portions includes
   adjustable reflecting means positioned in the path of one of said beam portions for varying the distance traveled by said one beam portion to said diffusely scattering means, whereby desired path differences are produced.

7. An apparatus for studying the coherence of laser beams as in claim 1, wherein:
   said diffusely scattering means includes a first region illuminated by both of said two beam portions and a second region illuminated by only one of said beam portions.

8. An apparatus for studying the coherence of laser beams as in claim 1, wherein:
   said diffusely scattering means includes a scale for measuring dimensions on an illuminated surface thereof; and said scale is observable by said observing means.

9. An apparatus for studying the coherence of laser beams as in claim 6, further comprising:
 a scale associated with said adjustable reflecting means for measuring movements thereof.

10. An apparatus for studying the coherence of laser beams as in claim 1, wherein:
rays of said two beam portions impinging at the same point of said diffusely scattering means have path differences in the range from zero to at least $C/2\Delta\nu$, where $C$ is the velocity of light and $\Delta\nu$ is the frequency bandwidth of the light radiation within which the coherence study is to be carried out.

* * * * *